US010841752B2

(12) United States Patent
Sugimoto

(10) Patent No.: US 10,841,752 B2
(45) Date of Patent: Nov. 17, 2020

(54) TERMINAL DEVICES, INFORMATION PROCESSING METHODS, AND COMPUTER READABLE STORAGE MEDIUMS

(71) Applicant: LINE Corporation, Tokyo (JP)

(72) Inventor: Kenichi Sugimoto, Tokyo (JP)

(73) Assignee: LINE CORPORATION, Tokyo (JP)

( * ) Notice: Subject to any disclaimer, the term of this patent is extended or adjusted under 35 U.S.C. 154(b) by 0 days.

(21) Appl. No.: 16/750,484

(22) Filed: Jan. 23, 2020

(65) Prior Publication Data
US 2020/0162857 A1 May 21, 2020

Related U.S. Application Data

(60) Continuation of application No. 16/148,149, filed on Oct. 1, 2018, now Pat. No. 10,582,344, which is a
(Continued)

(30) Foreign Application Priority Data

Mar. 31, 2015 (JP) ................................. 2015-074149

(51) Int. Cl.
H04W 4/08 (2009.01)
H04W 8/18 (2009.01)
(Continued)

(52) U.S. Cl.
CPC .............. *H04W 4/08* (2013.01); *H04W 4/80* (2018.02); *H04W 8/186* (2013.01); *H04W 76/15* (2018.02); *H04W 8/005* (2013.01); *H04W 88/04* (2013.01)

(58) Field of Classification Search
CPC ......... H04W 4/08; H04W 4/80; H04W 76/15; H04W 84/18; H04W 88/04; H04W 8/005; H04W 8/186
(Continued)

(56) References Cited

U.S. PATENT DOCUMENTS 6,957,229 B1* 10/2005 Dyor ..................... G06F 16/954
7,917,748 B2 3/2011 Hengeveld et al.
(Continued)

FOREIGN PATENT DOCUMENTS

JP 2001-333451 A 11/2001
JP 2012-178062 A 9/2012
(Continued)

OTHER PUBLICATIONS

Non-Final Office Action dated Oct. 12, 2016 in U.S. Appl. No. 14/837,748.
(Continued)

*Primary Examiner* — Tan H Trinh
(74) *Attorney, Agent, or Firm* — Harness, Dickey & Pierce, P.L.C.

(57) ABSTRACT

A terminal device includes at least one processor and a transceiver. The at least one processor is configured to execute computer readable instructions to generate a list of a plurality of other terminal devices located within a threshold range from the terminal device via short-range wireless communication. The transceiver is configured to transmit, in response to selection of a set of terminal devices from among the plurality of other terminal devices included in the list, a request to establish an association with users corresponding to terminal devices in the selected set of terminal devices.

13 Claims, 11 Drawing Sheets

Related U.S. Application Data division of application No. 14/837,748, filed on Aug. 27, 2015, now abandoned.

(51) Int. Cl.
*H04W 76/15* (2018.01)
*H04W 4/80* (2018.01)
*H04W 88/04* (2009.01)
*H04W 8/00* (2009.01)

(58) Field of Classification Search
USPC .............. 455/41.1, 41.2, 457; 370/329; 705/14.25, 319; 709/223, 204, 206, 218
See application file for complete search history.

(56) References Cited

U.S. PATENT DOCUMENTS

| | | | |
|---|---|---|---|
| 8,565,801 B2 | 10/2013 | Corson et al. | |
| 9,210,192 B1 | 12/2015 | Kim et al. | |
| 9,307,184 B2 | 4/2016 | McAuley | |
| 9,318,016 B2 | 4/2016 | Park | |
| 9,407,624 B1 | 8/2016 | Myers et al. | |
| 9,495,077 B2 | 11/2016 | Sasaoka et al. | |
| 9,668,194 B2 | 5/2017 | Baligh et al. | |
| 10,582,344 B2* | 3/2020 | Sugimoto | H04W 4/80 |
| 2003/0018530 A1 | 1/2003 | Walker et al. | |
| 2003/0097408 A1 | 5/2003 | Kageyama et al. | |
| 2004/0242250 A1 | 12/2004 | Sasai et al. | |
| 2005/0048954 A1 | 3/2005 | Gortz et al. | |
| 2005/0239405 A1 | 10/2005 | Myyry et al. | |
| 2006/0053208 A1 | 3/2006 | Laurila et al. | |
| 2006/0053225 A1 | 3/2006 | Poikselka et al. | |
| 2006/0182045 A1 | 8/2006 | Anderson | |
| 2006/0229014 A1 | 10/2006 | Harada et al. | |
| 2007/0033257 A1 | 2/2007 | Nakajima et al. | |
| 2007/0077949 A1 | 4/2007 | Henderson et al. | |
| 2007/0173266 A1 | 7/2007 | Barnes | |
| 2008/0070593 A1 | 3/2008 | Altman et al. | |
| 2008/0114834 A1 | 5/2008 | Miyazaki | |
| 2008/0125157 A1 | 5/2008 | Zhang | |
| 2008/0147722 A1 | 6/2008 | Dolin et al. | |
| 2008/0301241 A1 | 12/2008 | Svendsen | |
| 2009/0190590 A1 | 7/2009 | Agetsuma et al. | |
| 2009/0292799 A1* | 11/2009 | Eisener | H04L 67/04 709/223 |
| 2010/0009708 A1 | 1/2010 | Horio et al. | |
| 2010/0016006 A1* | 1/2010 | Inagaki | H04W 8/186 455/518 |
| 2010/0081376 A1 | 4/2010 | Emura | |
| 2010/0086079 A1 | 4/2010 | Jung | |
| 2010/0088367 A1 | 4/2010 | Brown et al. | |
| 2010/0164685 A1 | 7/2010 | Pering et al. | |
| 2010/0214987 A1* | 8/2010 | Mori | A63F 13/73 370/328 |
| 2011/0173073 A1 | 7/2011 | Wang et al. | |
| 2011/0231783 A1 | 9/2011 | Nomura | |
| 2011/0307434 A1 | 12/2011 | Rostampour et al. | |
| 2012/0017081 A1 | 1/2012 | Courtney et al. | |
| 2012/0020238 A1* | 1/2012 | Suetsugu | H04L 51/04 370/252 |
| 2012/0020339 A1 | 1/2012 | Lai | |
| 2012/0044057 A1 | 2/2012 | Kang et al. | |
| 2012/0057456 A1* | 3/2012 | Bogatin | H04W 4/50 370/230.1 |
| 2012/0081556 A1 | 4/2012 | Hwang et al. | |
| 2012/0122396 A1 | 5/2012 | Ha | |
| 2012/0220376 A1 | 8/2012 | Takayama et al. | |
| 2012/0309309 A1* | 12/2012 | Cho | H04W 4/80 455/41.1 |
| 2013/0005257 A1 | 1/2013 | Rajaraman et al. | |
| 2013/0054694 A1 | 2/2013 | Maeng et al. | |
| 2013/0065526 A1 | 3/2013 | Pottier et al. | |
| 2013/0080644 A1 | 3/2013 | Kimura | |
| 2013/0080782 A1 | 3/2013 | Rajadurai et al. | |
| 2013/0103844 A1 | 4/2013 | Bulut et al. | |
| 2013/0110978 A1 | 5/2013 | Gordon et al. | |
| 2013/0111044 A1 | 5/2013 | Cherian et al. | |
| 2013/0167196 A1 | 6/2013 | Spencer et al. | |
| 2013/0191322 A1 | 7/2013 | Sugano et al. | |
| 2013/0217332 A1* | 8/2013 | Altman | H04W 12/04 455/41.2 |
| 2013/0225154 A1 | 8/2013 | Park | |
| 2013/0232197 A1 | 9/2013 | Shin et al. | |
| 2013/0258382 A1 | 10/2013 | Sato | |
| 2013/0267174 A1* | 10/2013 | Moon | H04B 5/0031 455/41.1 |
| 2013/0275881 A1 | 10/2013 | Hahm et al. | |
| 2013/0288668 A1 | 10/2013 | Pragada et al. | |
| 2014/0057566 A1 | 2/2014 | Watfa et al. | |
| 2014/0059124 A1 | 2/2014 | Song et al. | |
| 2014/0089513 A1* | 3/2014 | Adachi | H04W 76/10 709/227 |
| 2014/0094198 A1 | 4/2014 | Heo et al. | |
| 2014/0095659 A1 | 4/2014 | Won | |
| 2014/0169285 A1 | 6/2014 | Sagfors et al. | |
| 2014/0178028 A1 | 6/2014 | Park et al. | |
| 2014/0186011 A1 | 7/2014 | Harwell et al. | |
| 2014/0192737 A1* | 7/2014 | Belghoul | H04W 4/021 370/329 |
| 2014/0195608 A1 | 7/2014 | Takusari et al. | |
| 2014/0214933 A1 | 7/2014 | Liu et al. | |
| 2014/0243035 A1* | 8/2014 | Jung | H04W 8/186 455/519 |
| 2014/0243038 A1 | 8/2014 | Schmidt et al. | |
| 2014/0269557 A1 | 9/2014 | Mechaley, Jr. | |
| 2014/0315591 A1 | 10/2014 | Ukita et al. | |
| 2014/0323048 A1 | 10/2014 | Kang | |
| 2014/0324993 A1 | 10/2014 | Li et al. | |
| 2014/0337430 A1 | 11/2014 | Jo et al. | |
| 2014/0357269 A1 | 12/2014 | Zhou et al. | |
| 2015/0046542 A1 | 2/2015 | Yamamoto et al. | |
| 2015/0055504 A1 | 2/2015 | Bellamkonda et al. | |
| 2015/0065148 A1 | 3/2015 | De Pasquale et al. | |
| 2015/0093992 A1 | 4/2015 | Tanaka | |
| 2015/0127565 A1 | 5/2015 | Chevalier et al. | |
| 2015/0149644 A1 | 5/2015 | Shin et al. | |
| 2015/0154438 A1 | 6/2015 | Tobita et al. | |
| 2015/0163840 A1 | 6/2015 | Ji et al. | |
| 2015/0189579 A1 | 7/2015 | Yeon et al. | |
| 2015/0215775 A1 | 7/2015 | Burch et al. | |
| 2015/0223011 A1 | 8/2015 | Yato | |
| 2015/0230208 A1 | 8/2015 | Ukita et al. | |
| 2015/0271136 A1 | 9/2015 | Farris | |
| 2015/0271293 A1 | 9/2015 | Murata | |
| 2015/0289125 A1 | 10/2015 | Van Phan et al. | |
| 2015/0319595 A1 | 11/2015 | Hakola et al. | |
| 2015/0326707 A1 | 11/2015 | Lee et al. | |
| 2015/0334188 A1* | 11/2015 | Chiba | H04L 67/125 709/204 |
| 2015/0349917 A1 | 12/2015 | Skaaksrud | |
| 2015/0358792 A1* | 12/2015 | Hashimoto | H04W 8/26 370/329 |
| 2016/0008720 A1 | 1/2016 | Inukai et al. | |
| 2016/0044731 A1 | 2/2016 | Lee et al. | |
| 2016/0061472 A1 | 3/2016 | Lee et al. | |
| 2016/0110358 A1 | 4/2016 | Lee | |
| 2016/0142536 A1 | 5/2016 | Bendi et al. | |
| 2016/0143080 A1 | 5/2016 | Enomoto et al. | |
| 2016/0191433 A1 | 6/2016 | Song | |
| 2016/0212201 A1 | 7/2016 | Munemann | |
| 2016/0227463 A1 | 8/2016 | Baligh et al. | |
| 2016/0253651 A1 | 9/2016 | Park et al. | |
| 2016/0276873 A1 | 9/2016 | Ben Hanoch et al. | |
| 2016/0278006 A1 | 9/2016 | Lee et al. | |
| 2016/0278068 A1 | 9/2016 | Chen et al. | |
| 2016/0285628 A1 | 9/2016 | Carrer et al. | |
| 2016/0285816 A1 | 9/2016 | Schmid et al. | |
| 2016/0323801 A1 | 11/2016 | Serita et al. | |
| 2017/0150330 A1* | 5/2017 | Kim | H04W 48/16 |
| 2017/0188406 A1 | 6/2017 | Baligh et al. | |
| 2017/0300980 A1 | 10/2017 | Soldate et al. | |

(56) References Cited

U.S. PATENT DOCUMENTS

2018/0270181 A1    9/2018  Shan et al.
2019/0387367 A1*  12/2019  Sugimoto ............... H04W 4/08

FOREIGN PATENT DOCUMENTS

| JP | 5421439 B2 | 2/2014 |
| JP | 2014-041658 A | 3/2014 |
| JP | 2014-134908 A | 7/2014 |
| KR | 2013-0033485 A | 4/2013 |
| KR | 2014-0115289 A | 9/2014 |
| WO | WO-2014/051411 A1 | 4/2014 |

OTHER PUBLICATIONS

Final Office Action dated Apr. 12, 2017 in U.S. Appl. No. 14/837,748.
Non-Final Office Action dated Jul. 25, 2017 in U.S. Appl. No. 14/837,748.
Final Office Action dated Jan. 18, 2018 in U.S. Appl. No. 14/837,748.
Non-Final Office Action dated Jul. 6, 2018 in U.S. Appl. No. 14/837,748.
Office Action dated Jan. 22, 2019 for Japanese Patent Application No. 2015-074149.
Non-Final Office Action dated Jan. 4, 2019 in U.S. Appl. No. 16/148,149.
Notice of Allowance dated Jun. 3, 2019 in U.S. Appl. No. 16/148,149.
Notice of Allowance dated Sep. 25, 2019 in U.S. Appl. No. 16/555,493.
Notice of Allowance dated Oct. 28, 2019 in U.S. Appl. No. 16/148,149.

\* cited by examiner

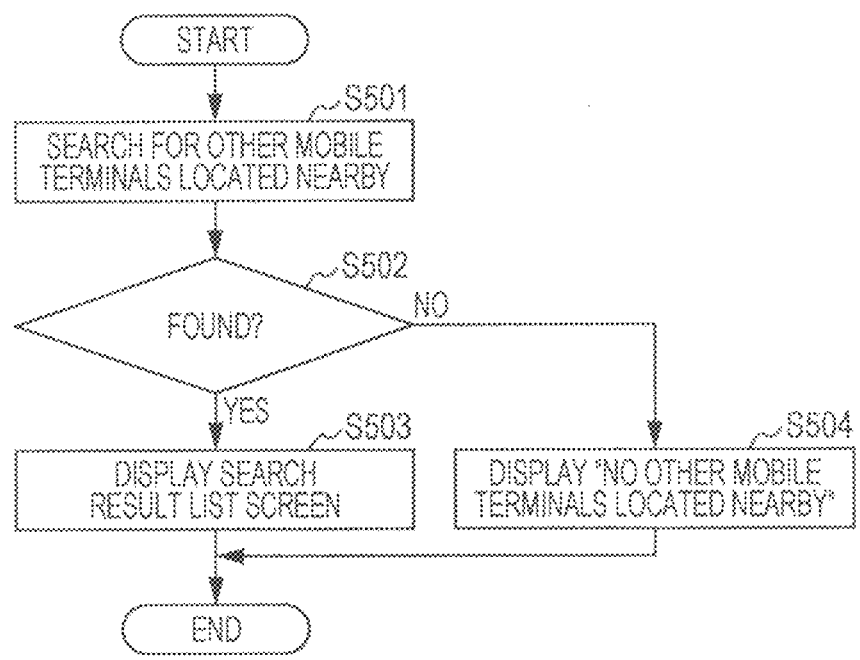

FIG. 8A

Join Group satoh (user ID: uid001) created a group including you as a member.
Do you join the group?

| Other Members | |
|---|---|
| User Name | User ID |
| satoh | uid001 |
| yamada | uid004 |
| ... | ... |

[Agree] [Decline]

FIG. 8B

Join Group satoh (user ID: uid001) created a group including you as a member.
Do you join the group?

| Other Members | |
|---|---|
| User Name | User ID |
| satoh | uid001 |
| suzuki | uid002 |
| ... | ... |

[Agree] [Decline]

TERMINAL DEVICES, INFORMATION PROCESSING METHODS, AND COMPUTER READABLE STORAGE MEDIUMS

CROSS-REFERENCE TO RELATED APPLICATION(S)

This application is a Continuation of U.S. application Ser. No. 16/148,149, filed on Oct. 1, 2018, which is a Divisional Application of U.S. application Ser. No. 14/837,748, filed on Aug. 27, 2015, which claims priority under 35 U.S.C. § 119 to Japanese Patent Application No. 2015-074149, filed on Mar. 31, 2015, in the Japanese Patent Office, the entire contents of all of which are incorporated herein by reference.

BACKGROUND

Field

One or more example embodiments relate to terminal devices, information processing methods, and/or computer readable storage mediums.

Description of Related Art

Within services enabling transmission and reception of messages between registered users, users are able to search for other users located nearby using Global Positioning System (GPS) functions installed at users' mobile terminals. The users are then allowed to register each other.

In addition, a mobile terminal is able to identify another mobile terminal by using short-range wireless communication.

When users perform a registration operation (e.g., registration of a friend relationship) to transmit and receive messages using services such as an instant messaging (IM) service, which enables transmission and reception of messages between users, each of the users performs an operation for registering the other user. Accordingly, in the case of registering a plurality of users, each user needs to perform the registration operation with each of the other users. The same applies to the case where a plurality of other users are found through a search using GPS functionality. More specifically, even in situations where a plurality of other users are found through a search using GPS functionality, a user needs to perform the registration operation for each of the other users whom the user wishes to register. The user is not allowed to collectively register a plurality of other users at one time.

SUMMARY

At least one example embodiment enables registration of relationships and/or associations with a plurality of users using relatively short-range wireless communication.

At least one example embodiment provides a terminal device connected, via a network, to a server device configured to manage a relationship between users configured to utilize a message transmission-reception service, and including a display unit and a transmission unit. The display unit is configured to display a list of other terminal devices identified to be located within a threshold (or alternatively given, desired or predetermined) range from the terminal device via short-range wireless communication. The transmission unit is configured to transmit to the server device, upon selection of a plurality of other terminal devices from among the other terminal devices included in the list, a request to establish a relationship with users of the plurality of selected other terminal devices.

According to at least one example embodiment, a relationship with a plurality of users may be registered by using short-range wireless communication.

At least one example embodiment provides a terminal device comprising: at least one processor configured to execute computer readable instructions to generate a list of a plurality of other terminal devices located within a threshold range from the terminal device via short-range wireless communication; and a transceiver configured to transmit, in response to selection of a set of terminal devices from among the plurality of other terminal devices included in the list, a request to establish an association with users corresponding to terminal devices in the selected set of terminal devices.

According to at least some example embodiments, the transceiver may be further configured to transmit, in response to the selection of the set of terminal devices, a request to establish a group of users, the group of users including a user of the terminal device and the users corresponding to the terminal devices in the selected set of terminal devices.

The transceiver may be further configured to transmit, in response to the selection of the set of terminal devices, a request to establish an association between a user of the terminal device and each of the users corresponding to the terminal devices in the selected set of terminal devices.

The transceiver may be further configured to transmit, in response to the selection of the set of terminal devices, a request to establish an association between pairs of users, each pair of users including a user of the terminal device and a user from among the users corresponding to the terminal devices in the selected set of terminal devices.

The at least one processor may be configured to execute computer readable instructions to generate a list of users corresponding to the plurality of other terminal devices based on user IDs received via the short-range wireless communication.

The at least one processor may be configured to execute computer readable instructions to: receive a response to the request to establish the association; and display a request to agree to establish the association.

The short-range wireless communication may be based on Bluetooth Low Energy.

At least one other example embodiment provides an information processing method implemented in a terminal device, the information processing method comprising: generating a list of a plurality of other terminal devices located within a threshold range from the terminal device via short-range wireless communication; and transmitting, in response to selection of a set of terminal devices from among the plurality of other terminal devices included in the list, a request to establish an association with users corresponding to terminal devices in the selected set of terminal devices.

At least one other example embodiment provides a non-transitory computer readable medium including computer-readable instructions that, when executed on a terminal device including at least one processor, cause the terminal device to perform a method comprising: generating a list of a plurality of other terminal devices located within a threshold range from the terminal device via short-range wireless communication; and transmitting, in response to selection of a set of terminal devices from among the plurality of other terminal devices included in the list, a request to establish an association with users corresponding to terminal devices in the selected set of terminal devices.

According to at least some example embodiments, the method may further include: transmitting, in response to the selection of the set of terminal devices, a request to establish a group of users, the group of users including a user of the terminal device and the users corresponding to the terminal devices in the selected set of terminal devices.

The method may further include: transmitting, in response to the selection of the set of terminal devices, a request to establish an association between a user of the terminal device and each of the users corresponding to the terminal devices in the selected set of terminal devices.

The method may further include: transmitting, in response to the selection of the set of terminal devices, a request to establish an association between pairs of users, each pair of users including a user of the terminal device and a user from among the users corresponding to the terminal devices in the selected set of terminal devices.

The generating may generate a list of users corresponding to the plurality of other terminal devices based on user IDs received via the short-range wireless communication.

The method may further include: receiving a response to the request to establish the association; and displaying a request to agree to establish the association.

The short-range wireless communication is based on Bluetooth Low Energy.

At least one other example embodiment provides a messaging system comprising a messaging server. The messaging server includes a memory and at least one processor. The memory is configured to store computer readable instructions. The at least one processor is configured to execute the computer readable instructions to: generate a group relationship table based on a received group relationship registration request from a first terminal device, the group relationship registration request including a user identifier associated with the first terminal device and a user identifier of at least one second terminal device, the group relationship table being indicative of an association between the first terminal device and the at least one second terminal device; register the group relationship table in a group relationship database; and update the group relationship table based on an agreement response received from the at least one second terminal device, the agreement response indicating whether the at least one second terminal device has agreed to be associated with the first terminal device.

The messaging server may further include a transceiver. The transceiver may be configured to: receive the group relationship registration request from the first terminal device; transmit a group relationship registration notification to the first terminal device in response to generation of the group relationship table by the at least one processor; transmit an agreement request to the at least one second terminal device, the agreement request including a group identifier associated with the group relationship table and user identifiers stored in the group relationship table, and the agreement request requesting to associate the at least one second terminal device with the first terminal device; and receive the agreement response from the at least one second terminal device.

The system may further include the at least one second terminal device. The at least one second terminal device may include a transceiver and at least one processor. The transceiver may be configured to: receive the agreement request from the messaging server; and transmit the agreement response to the messaging server. The at least one processor may be configured to execute computer readable instructions to determine whether to accept the request to associate the at least one second terminal device with the first terminal device in response to the agreement request from the messaging server.

The system may further include the first terminal device. The first terminal device may include at least one processor and a transceiver. The at least one processor may be configured to execute computer readable instructions to: generate a list of a plurality of other terminal devices located within a threshold range from the first terminal device via short-range wireless communication, the plurality of other terminal devices including the at least one second terminal device. The transceiver may be configured to: transmit, in response to selection of a set of terminal devices from among the plurality of other terminal devices included in the list, the group relationship registration request to the messaging server, the set of terminal devices including the at least one second terminal device.

BRIEF DESCRIPTION OF THE DRAWINGS

FIG. 4 is a diagram illustrating an example of a group relationship database.

FIG. 5 is a flowchart of a search process according to an example embodiment.

FIGS. 8A and 8B are conceptual diagrams of an example of a group-joining agree/decline screen.

DETAILED DESCRIPTION

Figure 1:
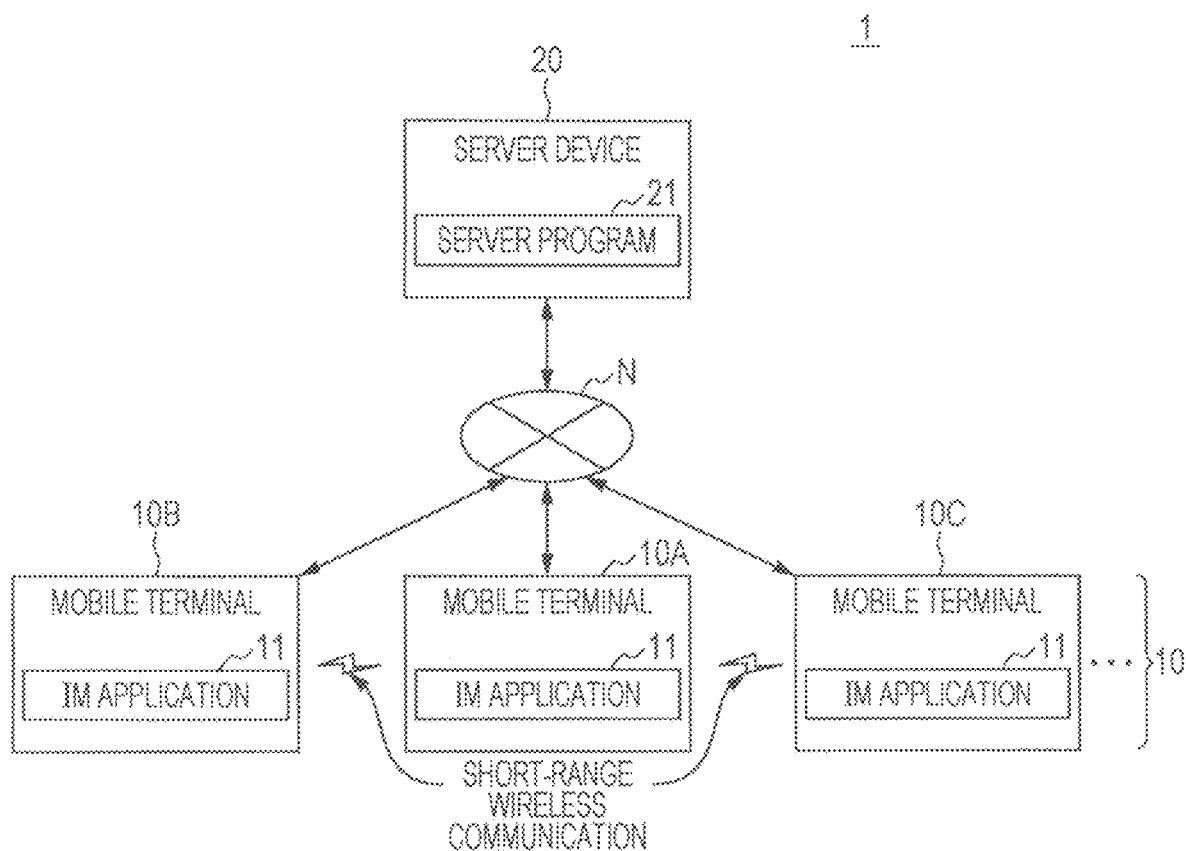
FIG. 1 is a diagram of an example configuration of a service providing system according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, some example embodiments are described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Example embodiments may be embodied in various different forms, and should not be construed as being limited only to the illustrated example embodiments. Rather, these embodiments are provided as examples so that this disclosure will be thorough and complete, and clear to those skilled in the art. Accordingly, known processes, elements, and techniques are not described with respect to some example embodiments. Unless otherwise noted, like reference numerals denote like elements throughout the attached drawings and written description, and thus, descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular example embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein. Moreover, example embodiments are described herein with reference to cross-sectional illustrations and/or plane illustrations that are idealized example illustrations. Accordingly, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure is illustrated in a cross-sectional view, an electronic device may include a plurality of the device structures, as would be illustrated by a plan view of the electronic device. The plurality of device structures may be arranged in an array and/or in a two-dimensional pattern.

Example embodiments disclosed herein may include hardware configured to execute program code including program instructions, software components, software modules, data files, data structures, and/or the like. Examples of program code include both machine code produced by a compiler and higher level program code that is executed using an interpreter. The hardware devices may include one or more processors or processing circuitry. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s) or processing circuitry.

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits, processing circuitry, and/or microprocessors. The hardware devices may be configured as special purpose processing circuits, processing circuitry, and/or hardware devices, to perform functions illustrated in one or more of the flow charts or sequence diagrams discussed herein.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer readable instructions (such as program code) for one or more operating systems and/or computer readable instructions (such as program code) for implementing the example embodiments described herein. The computer readable instructions may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The computer readable instructions may be loaded into the one or more storage devices and/or the one or more processors from a remote data storage device via a network interface, rather than via a computer readable storage medium. Additionally, the computer readable instructions may be loaded into the one or more storage devices and/or the one or more processors from a remote computing system that is configured to transfer and/or distribute the program code over a network. The remote computing system may transfer and/or distribute the computer readable instructions via a wired interface, an air interface, and/or any other like tangible or intangible medium. The one or more processors, the one or more storage devices, and/or the computer readable instructions may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of this disclosure. Thus, it is intended that the example embodiments cover the modifications and variations of the example embodiments provided they come within the scope of the appended claims and their equivalents.

Referring first to FIG. 1, a service providing system 1 according to an example embodiment will be described.

FIG. 1 is a diagram of a system configuration of a service providing system 1 according to an example embodiment. The service providing system 1 illustrated in FIG. 1 includes a plurality of mobile terminals 10 and a server device 20. The mobile terminals 10 and the server device 20 are connected to each other wirelessly and/or with a cable via a wide-area network N (e.g., the Internet) so as to be able to communicate with each other over wired and/or wireless connection.

The mobile terminals 10 are terminal devices, such as smartphones, mobile phones, notebook personal computers (PCs), wearable terminals, game consoles, or other electronic devices, used by users. An IM application 11 is installed on the mobile terminals 10. The IM application 11 enables messages to be exchanged via the network N by an IM service between the mobile terminals 10 used by users registered (e.g., pre-registered) at the server device 20. The user can transmit and receive messages to and from other users by using the IM application 11 installed on the mobile terminal 10. That is, for example, the user of the mobile terminal 10 is able to exchange messages with other users registered in the same group, or with other users registered as friends of the user's.

As a result of registering a plurality of users in the same group, a user included in the group becomes able to transmit messages to the other users included in the same group. As a result of registering other users as a user's friends, the registered users are added to a list, such as a contact list (e.g., friend list), and the user may more easily transmit and receive messages to and from the users registered as friends.

Hereinafter, a group including a plurality of users is referred to as a "group relationship" or "group association". Likewise, a relationship (or association) between two users who are friends is referred to as a "friend relationship" or "friend association".

Each of the mobile terminals 10 is capable of searching for the other mobile terminals 10 located within a threshold (or, alternatively, given, desired or predetermined) range (e.g., several centimeters to several tens of meters) from the mobile terminal 10 via short-range wireless communication. The user of each of the mobile terminals 10 may request that the server device 20 register other users whom the user wishes to register from among users of the other mobile terminals 10 found through the search. That is, for example, each of the mobile terminals 10 is capable of requesting the server device 20 to register a group relationship or friend relationship with one or more users.

Hereinafter, the plurality of mobile terminals 10 are also referred to as a "mobile terminal 10A", a "mobile terminal 10B", a "mobile terminal 10C", and so on when they are distinguished from one another. In addition, at least this example embodiment is described with regard to a case where a user of the mobile terminal 10A registers a group relationship with a plurality of other users at the server device 20.

A server program 21 is installed on the server device 20. The server device 20 is an information processing device that executes the server program to manage group relationships (or associations) of users who utilize the IM service.

Note that the service providing system 1 illustrated in FIG. 1 is merely an example and may have another configuration. For example, the server device 20 may be constituted by a plurality of information processing devices. In addition, the service utilized by users by using the mobile terminals 10 is not limited to the IM service, and may be a social networking service (SNS), a blog service, etc. That is, for example, at least this example embodiment is applicable to a service in which users who utilize the service are associated with one another to have a certain relationship (or association), such as a group relationship or a friend relationship, and data such as a message is transmitted and received between the associated users.

Figure 2A:
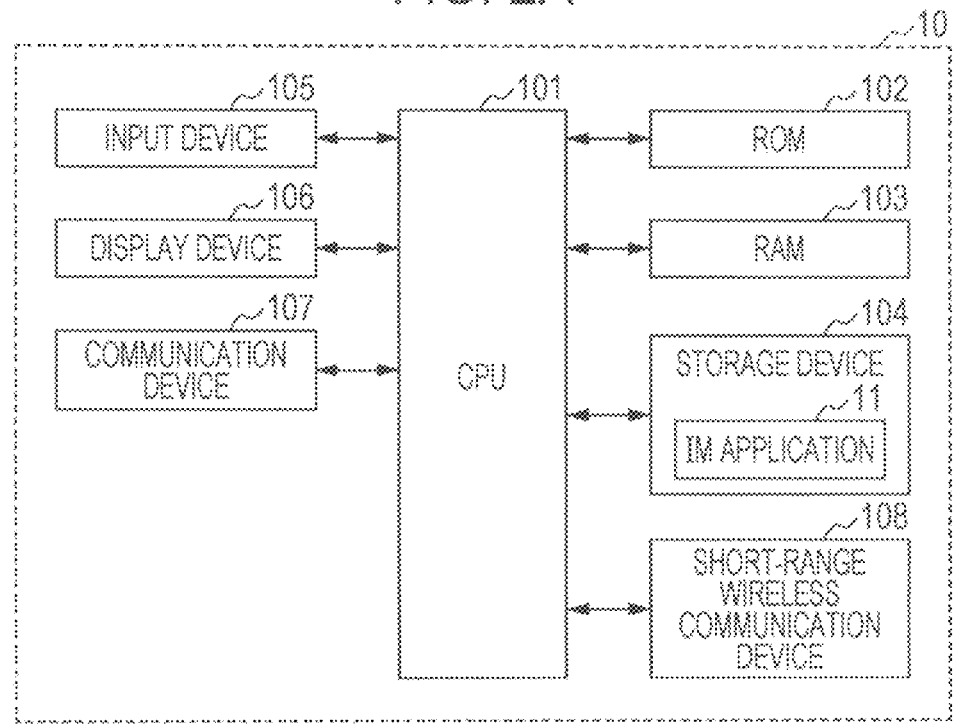
FIGS. 2A and 2B are diagrams of an example of a hardware configuration of the service providing system shown in FIG. 1.
Figure 2B:
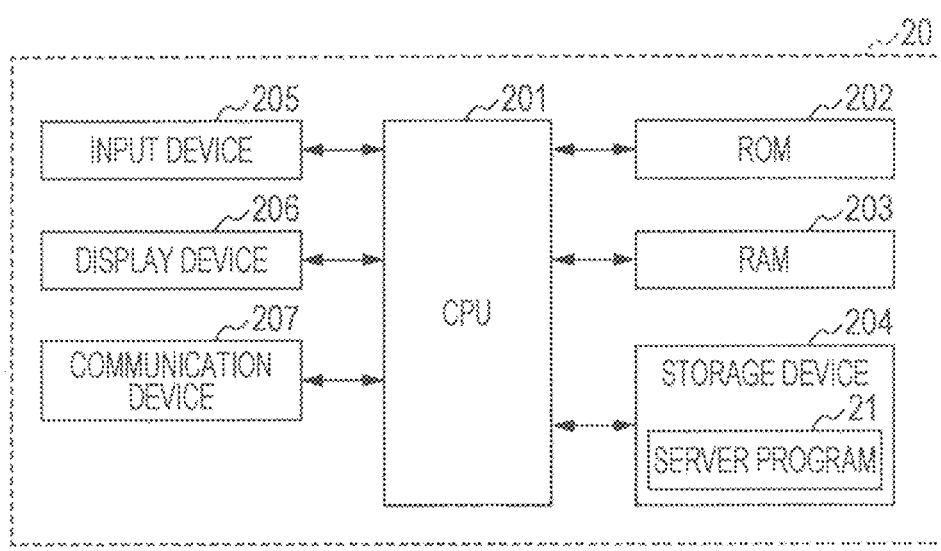

Referring next to FIGS. 2A and 2B, an example embodiment of a hardware configuration of the service providing system 1 will be described.

FIGS. 2A and 2B are diagrams of an example embodiment of a hardware configuration of the service providing system 1.

As illustrated in FIG. 2A, the mobile terminal 10 includes a central processing unit (CPU) 101, a read-only memory (ROM) 102, a random access memory (RAM) 103, and a storage device 104. The mobile terminal 10 also includes an input device 105, a display device 106, a communication device 107, and a short-range wireless communication device 108. These hardware components are connected to one another via a bus, for example.

The CPU 101 is a processing device that reads a program, computer readable instructions, and data, from a memory such as the ROM 102 or the storage device 104 to the RAM 103, and executes the program and/or computer readable instructions to perform one or more processes causing the CPU 101 to implement the overall control and functions of the mobile terminal 10. The ROM 102 stores a program, computer readable instructions, and/or data such as a Basic Input/Output System (BIOS) executed when the mobile terminal 10 is booted, operating system (OS) settings, and various settings. The RAM 103 is a volatile semiconductor memory that temporarily holds a program, computer readable instructions, and/or data. The storage device 104 may be a nonvolatile memory that stores a program, computer readable instructions, and/or data. Examples of the program and computer readable instructions stored in the storage device 104 include the IM application 11.

The input device 105 (e.g., a touchscreen or the like) is used by a user to input various operation signals. The display device 106 (e.g., a display or display unit) displays a processing result obtained by the mobile terminal 10. The communication device 107 is an interface for connecting the mobile terminal 10 to the network N. In at least one example embodiment, the communication device 107 may include one or more interfaces, antennas, and corresponding circuitry, for transmitting/receiving data over a wired and/or wireless connection. The communication device 107 may also be referred to as a transceiver.

The short-range wireless communication device 108 (e.g., a Bluetooth Low Energy (BLE) chip) is an interface for communicating with the other mobile terminals 10 by short-range wireless communication. The short-range wireless communication device 108 may include one or more interfaces, antennas, and corresponding circuitry, for transmitting/receiving data over a short-range wireless link. The short-range wireless communication device 108 may also be referred to as a short-range wireless transceiver.

Note that short-range wireless communication performed between the mobile terminals 10 is not limited to BLE. For example, infrared, ultrasound, or the like may be used. Short-range wireless communication may be performed with the other mobile terminals 10 over a radio wave by using, for example, Radio Frequency Identifier (RFID) technology, such as an IC tag or RFID tag.

As illustrated in FIG. 2B, the server device 20 includes a CPU 201, a ROM 202, a RAM 203, a storage device 204, an input device 205, a display device 206, and a communication device 207. These hardware components are connected to one another via a bus, for example.

The CPU 201 is a processing device that reads a program, computer readable instructions, and/or data, from a memory such as the ROM 202 or the storage device 204 to the RAM 203, and executes the program and/or computer readable instructions to perform one or more processes causing the CPU 101 to implement the overall control and functions of the server device 20. The ROM 202 stores a program, computer readable instructions, and/or data such as BIOS executed when the server device 20 is booted, OS settings, and various settings. The RAM 203 is a volatile semiconductor memory that temporarily holds a program, computer readable instructions, and/or data. The storage device 204 may be a nonvolatile memory that stores a program, computer readable instructions, and/or data. Examples of the program and computer readable instructions stored in the storage device 204 include the server program 21.

The input device 205 (e.g., a touch screen, keyboard, mouse, etc.) is used by a user to input various operation signals. The display device 206 (e.g., a display or display unit) displays a processing result obtained by the server device 20. Note that the input device 205 and/or the display device 206 may be connected and used when they are needed. The communication device 207 is an interface for connecting the server device 20 to the network N. The communication device 207 may include one or more interfaces, antennas, and corresponding circuitry, for transmitting/receiving data over a wired and/or wireless connection. The communication device 207 may also be referred to as a transceiver.

The mobile terminals 10 and the server device 20 according to at least this example embodiment include the hardware components described above and are capable of executing programs and/or computer readable instructions to implement various processes, which are discussed in more detail later.

Figure 3:
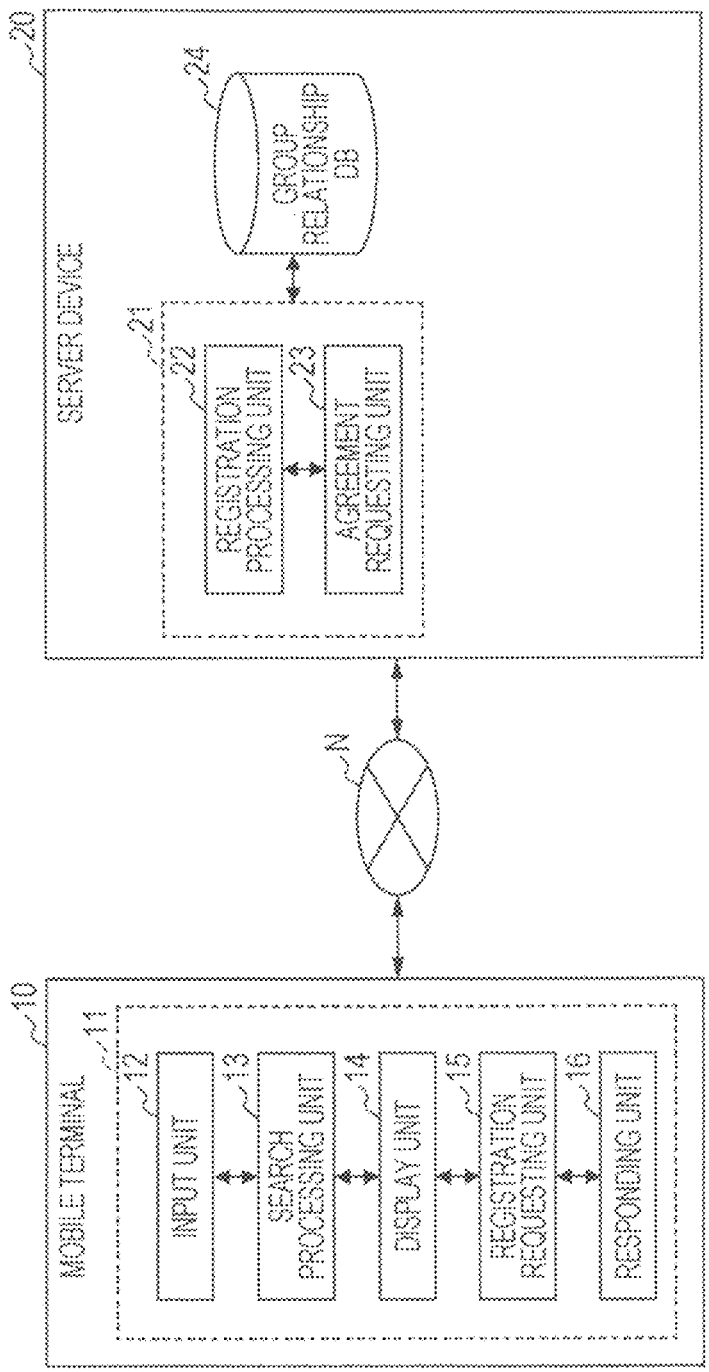
FIG. 3 is a diagram of an example of a functional configuration of the service providing system shown in FIG. 1.

Referring next to FIG. 3, an example embodiment of a functional configuration of the service providing system 1 will be described. FIG. 3 is a diagram of an example embodiment of a functional configuration of the service providing system 1.

As illustrated in FIG. 3, the IM application 11 of the mobile terminal 10 includes an input unit 12, a search processing unit 13, a display unit 14, a registration requesting unit 15, and a responding unit 16.

The input unit 12 may be implemented by the input device 105, and execution of a program and/or computer readable instructions by the CPU 101. The input unit 12 accepts an operation input by a user. Examples of the operation input by a user include an operation for searching for the other mobile terminals 10 located within a threshold (or alternatively given, desired, or predetermined) range from the user's mobile terminal 10.

The search processing unit 13 may be implemented by the short-range wireless communication device 108 and execution of a program and/or computer readable instructions by the CPU 101. In response to an instruction from the input unit 12, the search processing unit 13 transmits information (response request information) for searching for the other mobile terminals 10, within the threshold range from the mobile terminal 10.

In addition, upon receipt of response request information from the other mobile terminal 10, the search processing unit 13 transmits information (response information) containing, for example, a user ID and a user name identifying the user of the mobile terminal 10 to the server device 20 and/or to the other mobile terminal 10 that has transmitted the response request information.

The display unit 14 may be implemented by the display device 106 and execution of a program and/or computer readable instructions by the CPU 101. The display unit 14 causes the display device 106 to display a processing result, in response to an instruction from another unit. For example, the display unit 14 causes the display device 106 to display a list (search result list) of the other mobile terminals 10 found within the threshold range from the mobile terminal 10 by the search processing unit 13. In addition, for example, upon receipt of an agreement request requesting the user to join a group from the server device 20, the display unit 14 causes the display device 106 to display an agree/decline screen that allows the user to agree or decline to join the group.

The registration requesting unit 15 may be implemented by the communication device 107 and execution of a program and/or computer readable instructions by the CPU 101. The registration requesting unit 15 transmits, to the server device 20, a group relationship registration request. The group relationship registration request contains information concerning users of the other mobile terminals 10 selected from among the users included in the search result list. That is, for example, the registration requesting unit 15 transmits, to the server device 20, a group relationship registration request for setting the user of the mobile terminal 10 and a plurality of users selected by the user of the mobile terminal 10 from the search result list in a group.

The responding unit 16 may be implemented by the communication device 107 and execution of a program and/or computer readable instructions by the CPU 101. Upon the user selecting "Agree" or "Decline" on the agree/decline screen displayed by the display unit 14, the responding unit 16 transmits a response based on the user's selection to the server device 20.

As illustrated in FIG. 3, the server program 21 of the server device 20 includes a registration processing unit 22 and an agreement requesting unit 23. In addition, the server program 21 of the server device 20 utilizes a group relationship database (DB) 24.

The registration processing unit 22 may be implemented by the communication device 207 and execution of a program and/or computer readable instructions by the CPU 201. Upon receipt of a group relationship registration request from the mobile terminal 10, the registration processing unit 22 creates a group relationship table on the basis of the user IDs and the user names contained in the group relationship registration request and registers the group relationship table in the group relationship database 24.

In addition, upon receipt of a response indicating agreement (agreement response) from the mobile terminal 10 in response to an agreement request that has been transmitted by the agreement requesting unit 23, the registration processing unit 22 updates information concerning the user who has transmitted the agreement response from among the users included in the registered group relationship table. As a result, the user who has made the group relationship registration request and the users who have made the agreement response among the users included in the registered group relationship table become able to transmit and receive a message to and from each other.

As described above, a group relationship table including users assigned the user IDs contained in a group relationship registration request is created by the registration processing unit 22 upon receipt of the group relationship registration request. However, at this point, the users included in the group relationship table are not able to transmit and receive a message to and from each other. With such a configuration, transmission of a message to a user who has not agreed to join the group from the other user included in the group relationship table is suppressed and/or prevented.

The agreement requesting unit 23 may be implemented by the communication device 207 and execution of a program and/or computer readable instructions by the CPU 201. After the group relationship table has been registered by the registration processing unit 22, the agreement requesting unit 23 transmits an agreement request to the mobile terminals 10 of the users included in the group relationship table except for the user who has made the group relationship registration request.

The group relationship database 24 may be implemented by the storage device 204. The group relationship database 24 manages, for each group ID, a group relationship constituted by a plurality of users.

Referring now to FIG. 4, an example embodiment of the group relationship database 24 will be described. FIG. 4 is a diagram illustrating an example embodiment of the group relationship database 24.

As illustrated in FIG. 4, the group relationship database 24 stores, for each group ID, a group relationship table in which a group constituted by a plurality of users is managed. The group ID is information that uniquely identifies a group relationship table. The group ID is issued when the registration processing unit 22 receives a group relationship registration request, for example. Each group relationship table has data fields, such as fields for the user ID and the user name of each user constituting the group relationship and an agreement field indicating whether or not the user has agreed to join the group. This configuration allows the user of the mobile terminal 10 to transmit and receive, by using the IM application 11, a message to and from users having an associated agreement field storing "AGREED", which indicates that the user has agreed to join the group. The group relationship table is created by the registration processing unit 22 with the agreement field for the user who has made the group relationship registration request initially set to "AGREED", and is registered in the group relationship database 24.

Details of processes performed in the service providing system 1 according to an example embodiment will be described in more detail below.

Referring first to FIG. 5, a process performed when the user (assigned the user ID "uid001" and the user name "satoh") of the mobile terminal 10A searches for the other mobile terminals 10 located within a threshold (or alternatively, given, desired or predetermined) range from the mobile terminal 10A will be described. FIG. 5 is a flowchart illustrating a search process according to an example embodiment.

Referring to FIG. 5, at S501 the mobile terminal 10A performs an operation to search for the other mobile terminals 10 located within the threshold range (e.g., several centimeters to several tens of meters) from the mobile terminal 10A. The input unit 12 of the mobile terminal 10A accepts the operation, and requests the search processing unit 13 to search for the other mobile terminals 10. The search processing unit 13 of the mobile terminal 10A transmits response request information within the given range from the mobile terminal 10A for a given (or alternatively, desired or predetermined) period (e.g., one to several seconds).

The search processing unit 13 of the other mobile terminal 10 that has received the response request information from the mobile terminal 10A transmits response information to the mobile terminal 10A or the server device 20. The response information contains the user ID and the user name of the user of the mobile terminal 10 that has transmitted the response information. Upon receipt of the response information from the mobile terminals 10, the server device 20 transmits a list of the user IDs and the user names contained in the received response information to the mobile terminal 10A that has transmitted the response request information. In the case where the server device 20 receives response information, the response information need not contain the user name. In such a case, the server device 20 may obtain the user name corresponding to the user ID contained in the received response information from a given (or alternatively, desired or predetermined) storage area.

It is assumed hereinafter that the mobile terminal 10A has received the user IDs and the user names of the users of the mobile terminals 10B, 10C, and 10D. More specifically, it is assumed that the mobile terminal 10A has received the user ID "uid002" and the user name "suzuki" of the user of the mobile terminal 10B, the user ID "uid003" and the user name "tanaka" of the user of the mobile terminal 10C, and the user ID "uid004" and the user name "yamada" of the user of the mobile terminal 10D.

Still referring to FIG. 5, at S502 the search processing unit 13 of the mobile terminal 10A determines whether or not the other mobile terminals 10 are located within the threshold range from the mobile terminal 10A. More specifically, the search processing unit 13 of the mobile terminal 10A determines whether or not the user ID and the user name of the user of the other mobile terminal 10 have been received. If the search processing unit 13 of the mobile terminal 10A has received the user ID and the user name of the user of the other mobile terminal 10, then the process proceeds to S503. If the search processing unit 13 of the mobile terminal 10A has not received any user ID and any user name of the user of the other mobile terminal 10, then the process proceeds to S504.

Figure 6:
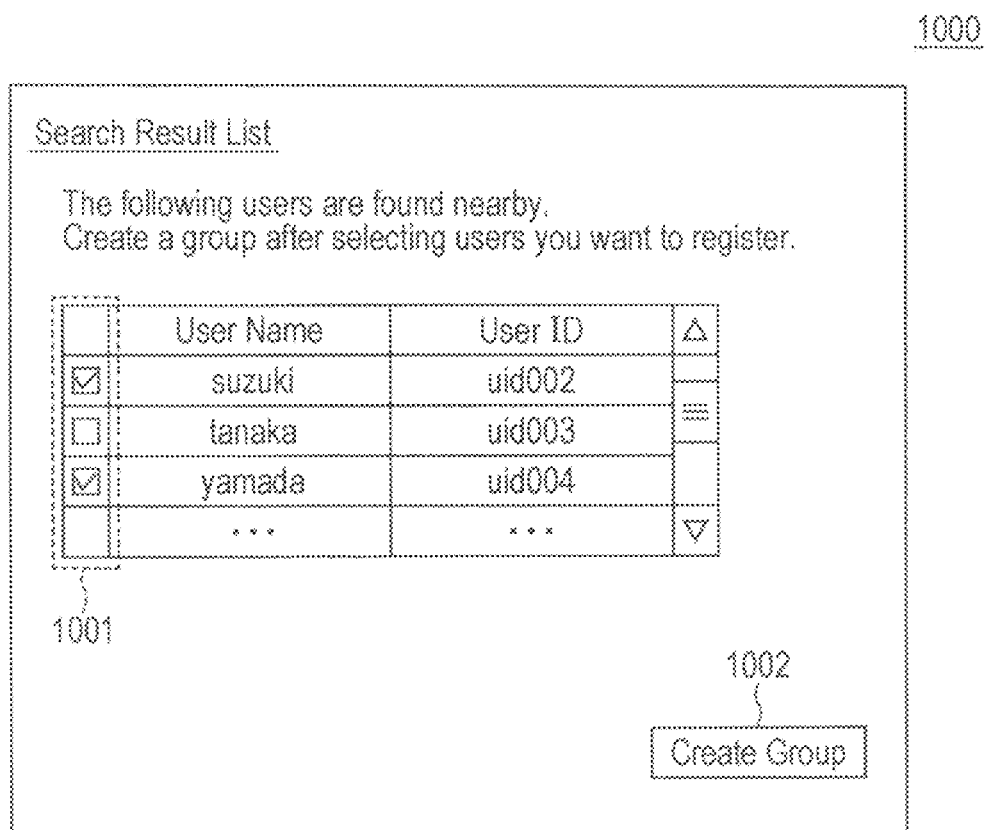
FIG. 6 is a conceptual diagram of an example of a search result list screen.

At S503, the display unit 14 of the mobile terminal 10A causes the display device 106 to display, for example, the search result list screen 1000 illustrated in FIG. 6 on the basis of the received user IDs and user names of the users of the other mobile terminals 10.

FIG. 6 is a conceptual diagram of an example search result list screen 1000. On the search result list screen 1000 illustrated in FIG. 6, a list of the user IDs and the user names of the users of the other mobile terminals 10 that have been received by the search processing unit 13 of the mobile terminal 10A from the other mobile terminals 10 is displayed. As described above, the user IDs and the user names of the users of the other mobile terminals 10 located within the given range from the mobile terminal 10A are displayed as a list on the search result list screen 1000.

On the search result list screen 1000 illustrated in FIG. 6, a checkbox 1001 allows the user to select users who constitute a group relationship to be created. More specifically, the user of the mobile terminal 10A selects, using a touch screen to select the checkbox 1001, users whom the user wishes to select and presses a "Create Group" button 1002. Consequently, the mobile terminal 10A requests the server device 20 to register a group relationship for the user of the mobile terminal 10A and the users selected with the checkbox 1001. Note that the checkbox 1001 is merely an example, and the user may select users who constitute a group relationship to be created, for example, by tapping user names displayed as a list.

At S504, the display unit 14 of the mobile terminal 10A causes the display device 106 to display a message indicating that no other mobile terminals 10 are located within the threshold range from the mobile terminal 10A, for example. In this way, the user of the mobile terminal 10A can be informed that there are no other users sufficiently near the user.

As described above, the mobile terminal 10 according to at least this example embodiment searches for the other mobile terminals 10 located nearby by using short-range wireless communication, such as BLE, and displays the search result as a list. The user of the mobile terminal 10 can select users whom the user wishes to select from among users of the other mobile terminals 10 displayed in the list, and can register a group relationship including the user and the selected users, details of which will be described later.

For example purposes, it is assumed that the user of the mobile terminal 10A has selected the user (assigned the user ID "uid002" and the user name "suzuki") of the mobile terminal 10B and the user (assigned the user ID "uid004" and the user name "yamada") of the mobile terminal 10D on the search result list screen 1000 illustrated in FIG. 6.

Figure 7:
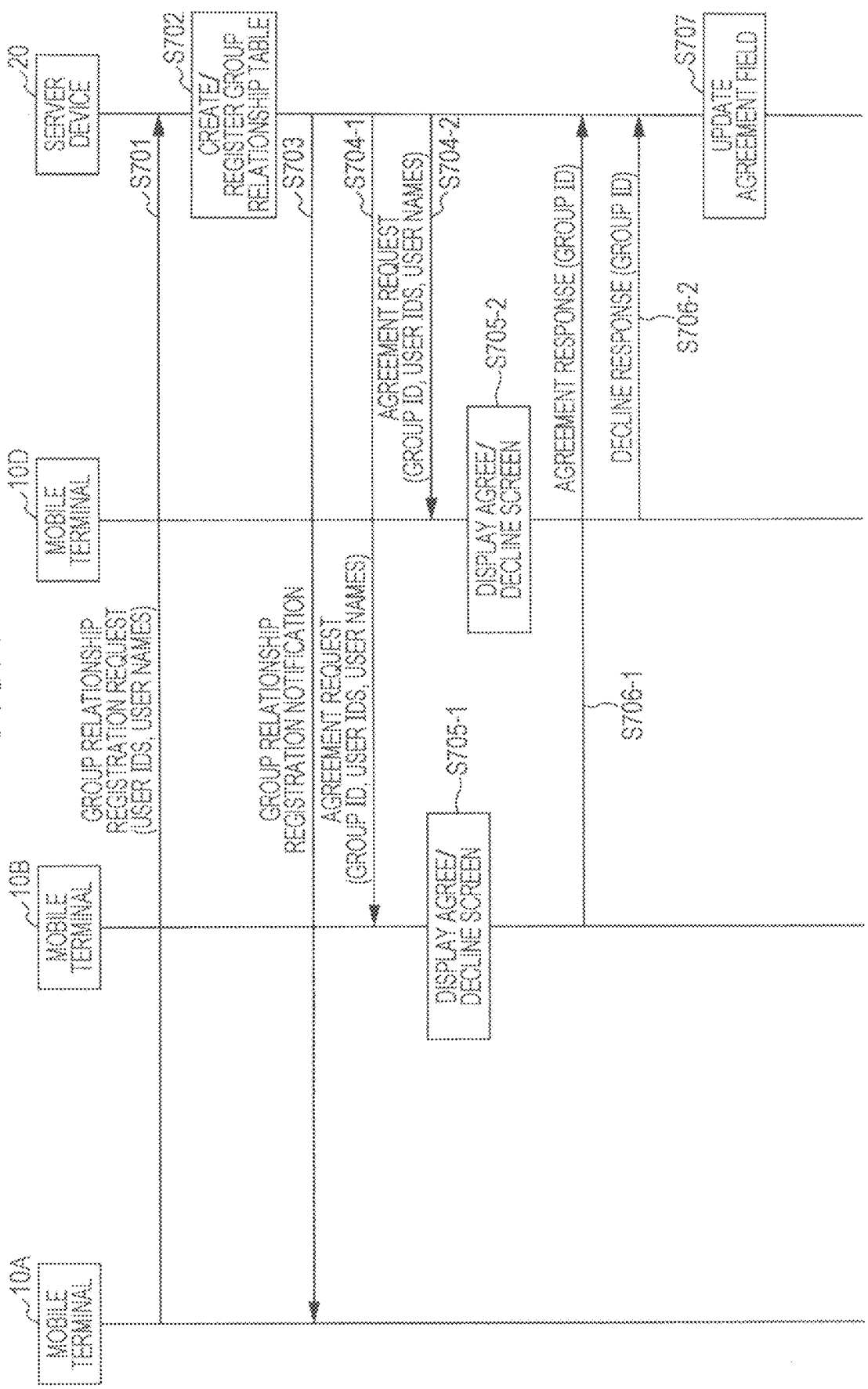
FIG. 7 is a sequence diagram illustrating a group relationship registration process according to an example embodiment.

Referring to FIG. 7, an example embodiment of a process performed in response to the user of the mobile terminal 10A pressing the "Create Group" button 1002 will be described.

FIG. 7 is a sequence diagram illustrating a group relationship registration process according to an example embodiment.

Upon the "Create Group" button 1002 being pressed on the search result list screen 1000 as described above, the registration requesting unit 15 of the mobile terminal 10A transmits a group relationship registration request to the server device 20 at S701. The group relationship registration request contains the user ID and the user name of the user of the mobile terminal 10A and the user IDs and the user names of the users selected with the checkbox 1001 on the search result list screen 1000. More specifically, in at least one example embodiment, the group relationship registration request contains the user ID "uid001" and the user name "satoh", the user ID "uid002" and the user name "suzuki", and the user ID "uid004" and the user name "yamada".

Upon receipt of the group relationship registration request, the registration processing unit 22 of the server device 20 creates a group relationship table on the basis of the group relationship registration request and registers the group relationship table in the group relationship database 24 at S702.

More specifically, the registration processing unit 22 creates a group relationship table indicating a group relationship of a group including the user IDs and the user names contained in the received group relationship registration request, by generating and/or issuing a group ID that uniquely identifies the group relationship table. The registration processing unit 22 then registers the created group relationship table in the group relationship database 24. At this time, the registration processing unit 22 sets the agreement field for the user of the mobile terminal 10 that has transmitted the group relationship registration request (e.g., the user assigned the user ID "uid001") to "AGREED" and sets the agreement field for the other users (e.g., the users assigned the user IDs "uid002" and "uid004") to "PENDING". It is assumed that the group relationship table registered at this time is assigned a group ID "G001".

Still referring to FIG. 7, at S703 the registration processing unit 22 of the server device 20 transmits a notification (group relationship registration notification) indicating completion of registration of the group relationship to the mobile terminal 10A that has transmitted the group relationship registration request. In this way, the user of the mobile terminal 10A can be informed that a group including the users selected on the search result list screen 1000 has been created and registered.

At S704-1, the agreement requesting unit 23 of the server device 20 transmits, to the mobile terminal 10B, an agreement request to request the user to join the group indicated by the registered group relationship table.

Similarly, at S704-2, the agreement requesting unit 23 of the server device 20 transmits an agreement request to the mobile terminal 10D. As described above, the agreement requesting unit 23 transmits an agreement request to users other than the user who has transmitted the group relationship registration request among the users included in the registered group relationship table. The agreement request contains the group ID of the group relationship table registered at S702 and the user IDs and the user names included in the registered group relationship table.

Upon receipt of the agreement request from the server device 20, at S705-1 the display unit 14 of the mobile terminal 10B causes the display device 106 to display a group-joining agree/decline screen. An example group-joining agree/decline screen 2000 is illustrated in FIG. 8A.

Referring to FIG. 8A, the group-joining agree/decline screen 2000 is a screen displayed on the display device 106 of the mobile terminal 10B so as to allow the user of the mobile terminal 10B to select whether to join the group indicated by the registered group relationship table. Note that information concerning the other members of the group indicated by the registered group relationship table is displayed on the group-joining agree/decline screen 2000. As shown in FIG. 8A, the group-joining agree/decline screen 2000 also includes an "Agree" button 2001 and a "Decline" button 2002.

Likewise, upon receipt of the agreement request from the server device 20, at S705-2 the display unit 14 of the mobile terminal 10D causes the display device 106 to display a group-joining agree/decline screen. An example of this group-joining agree/decline screen is illustrated in FIG. 8B.

Referring to FIG. 8B, the group-joining agree/decline screen 3000 is a screen displayed on the display device 106 of the mobile terminal 10D so as to allow the user of the mobile terminal 10D to select whether to join the group indicated by the registered group relationship table. Note that information concerning the other members of the group indicated by the registered group relationship table is displayed on the group-joining agree/decline screen 3000. As shown in FIG. 8B, the group-joining agree/decline screen 3000 also includes an "Agree" button 3001 and a "Decline" button 3002.

It is assumed in at least this example embodiment that the user of the mobile terminal 10B presses the "Agree" button 2001 to agree to join the group indicated by the registered group relationship table on the group-joining agree/decline screen 2000. In contrast, it is assumed that the user of the mobile terminal 10D presses the "Decline" button 3002 to decline to join the group indicated by the registered group relationship table on the group-joining agree/decline screen 3000.

Upon the user pressing the "Agree" button 2001 on the group-joining agree/decline screen 2000, at S706-1 the responding unit 16 of the mobile terminal 10B transmits, to the server device 20, an agreement response indicating that the user has agreed to join the group indicated by the registered group relationship table. The agreement response contains the group ID of the group relationship table indicating the group relationship registered at S702.

Upon the user pressing the "Decline" button 3002 on the group-joining agree/decline screen 3000, at S706-2 the responding unit 16 of the mobile terminal 10D transmits, to the server device 20, a decline response indicating that the user has declined to join the group indicated by the registered group relationship table. The decline response contains the group ID of the group relationship table indicating the group relationship registered at S702.

Upon receipt of the agreement response or the decline response from the mobile terminal 10, the registration processing unit 22 of the server device 20 updates the group relationship table assigned the group ID contained in the agreement response or the decline response at S707.

More specifically, upon receipt of the agreement response from the mobile terminal 10B, the registration processing unit 22 updates the agreement field for the user (assigned the user ID "uid002" and the user name "suzuki") of the mobile terminal 10B to "AGREED" in the group relationship table assigned the group ID "G001" contained in the agreement response. Upon receipt of the decline response from the mobile terminal 10D, the registration processing unit 22 deletes information concerning the user (e.g., assigned the user ID "uid004" and the user name "yamada") of the mobile terminal 10D from the group relationship table assigned the group ID "G001" contained in the decline response. As a result, a message can be transmitted to, and received from, the mobile terminal 10 of the user who has transmitted the agreement response, but the mobile terminal 10 of the user who has transmitted the decline response can be suppressed and/or prevented from joining the group.

The registration processing unit 22 deletes information concerning the user of the mobile terminal 10 that has transmitted a decline response from the group relationship table assigned the group ID contained in the decline response upon receipt of the decline response; however, the configuration is not limited to this example, and the agreement field may be updated to "DECLINED", for example.

As described above, the server device 20 according to at least one example embodiment can register a group relationship constituted by a plurality of users in accordance with a group relationship registration request transmitted from the mobile terminal 10. Consequently, the user of the mobile terminal 10 according to at least this example embodiment can transmit and receive a message to and from users included in the registered group relationship.

According to at least this example embodiment, the case of registering a group relationship for a group constituted by a plurality of users has been described; however, the configuration is not limited to this example, and a friend relationship between a user and users selected by the user on the search result list screen 1000 may be registered, for example.

In addition, in the above-described example embodiment, the server device 20 transmits an agreement request to the mobile terminals 10 of the users selected on the search result list screen 1000 (e.g., S704-1 and S704-2); however, transmission of an agreement request may be omitted. For example, in the case where a setting for omitting agreement is set in the mobile terminal 10 of the user selected on the search result list screen 1000, the server device 20 may execute a program and/or computer readable instructions to be configured not to transmit an agreement request to the mobile terminal 10 having such a setting. Alternatively, the server device 20 may execute a program and/or computer readable instructions to be configured not to transmit an agreement request by respectively setting the period for which and the range within which the mobile terminal 10 performs a search at S501 in FIG. 5 to be relatively short and/or narrow.

Another example embodiment of the service providing system 1 will now be described. In the service providing system 1 according to at least this example embodiment, friend relationships between a user of the mobile terminal 10 and users of the other mobile terminals 10 among users of the other mobile terminals 10 located within a threshold (or alternatively, given, desired, or predetermined) range from the mobile terminal 10 is registered on the basis of a social graph. For the sake of brevity, only differences between the above-described example embodiment and this example embodiment will be described. Functional configurations that are the same or substantially the same as that of the above-described example embodiment are denoted by reference numerals similar to, or the same as, those used in the description of the above-discussed example embodiment, and a detailed description thereof is omitted.

Figure 9:
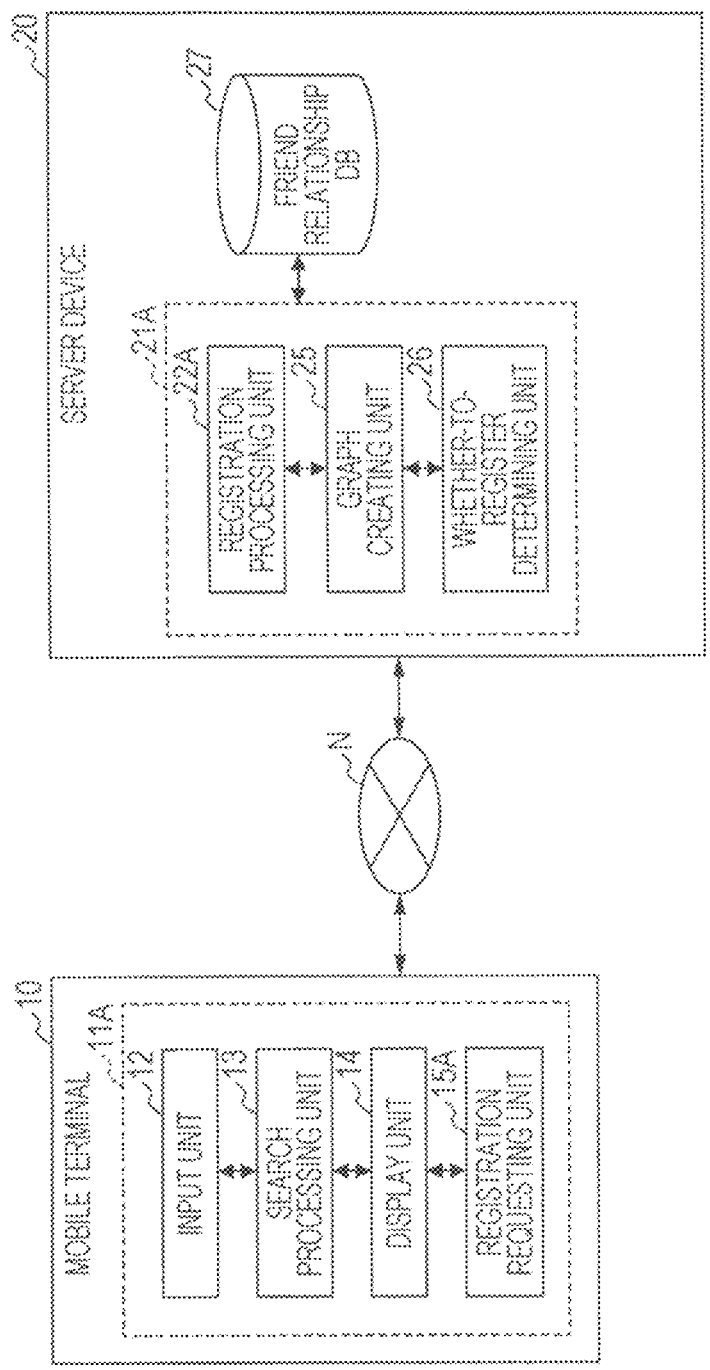
FIG. 9 is a diagram of an example of a functional configuration of a service providing system according to another example embodiment.

Referring first to FIG. 9, a functional configuration of the service providing system 1 according to at least this example embodiment will be described.

FIG. 9 is a diagram of an example of a functional configuration of the service providing system 1 according to another example embodiment.

As illustrated in FIG. 9, an IM application 11A of the mobile terminal 10 includes a registration requesting unit 15A. The registration requesting unit 15A transmits, to the server device 20, a friend relationship registration request requesting registration of friend relationships between a user of the mobile terminal 10 and users of the other mobile terminals 10 included in the search result list.

A server program 21A of the server device 20 includes a registration processing unit 22A, a graph creating unit 25, and a whether-to-register determining unit 26. In addition, the server program 21A of the server device 20 utilizes a friend relationship database (DB) 27.

The registration processing unit 22A updates a friend relationship registered in the friend relationship database 27 on the basis of the user IDs and the user names contained in the friend relationship registration request received from the mobile terminal 10 and the determination result obtained by the whether-to-register determining unit 26.

The graph creating unit 25 may be implemented by execution of a program and/or computer readable instructions by the CPU 201. Upon receipt of a friend relationship registration request, the graph creating unit 25 creates a social graph, which sets a user assigned a specified user ID at the center and has a distance N (N is an integer of 2 or greater) from the center, on the basis of the friend relationship database 27. A social graph is a graph in which each user is denoted by a node and a friend relationship between users is denoted by a link. A link is also referred to as an "edge". In addition, the term "distance" refers to the minimum number of links to reach a target node from the central node.

The whether-to-register determining unit 26 may be implemented by executing computer readable instructions by the CPU 201. The whether-to-register determining unit 26 determines the user ID for which a friend relationship is to be updated to "FRIEND" from among the user IDs contained in the received friend relationship registration request on the basis of the social graph created by the graph creating unit 25. More specifically, if a social graph having a distance of N or less from the user name "satoh" set at the center includes the user ID corresponding to the user name "suzuki", the whether-to-register determining unit 26 determines that a friend relationship between the user names "satoh" and "suzuki" is to be updated to "FRIEND". If the social graph does not include the user ID corresponding to the user name "suzuki", the whether-to-register determining unit 26 determines that the user names "satoh" and "suzuki" are not to be associated as "FRIEND". For example, when the distance N is set to 2 or 3, such a setting indicates that users who have a "mutual friend" or a "friend of a mutual friend" are set as friends.

Figures 10, 11:
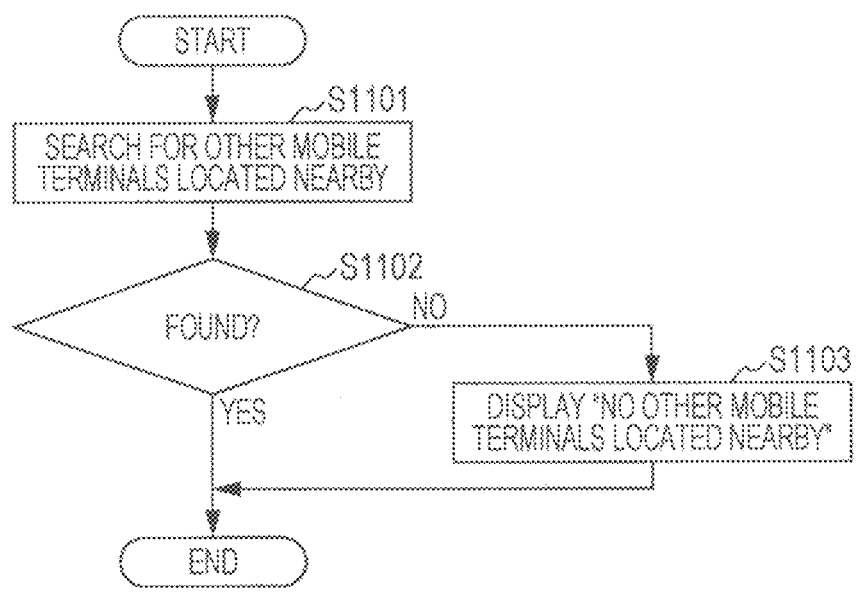
FIG. 10 is a diagram illustrating an example of a friend relationship database.
FIG. 11 is a flowchart of a search process according to another example embodiment.

The friend relationship database 27 may be implemented by the storage device 204. The friend relationship database 27 stores, for each user ID, a friend relationship table in which users who are registered as friends of the user's are managed. Referring now to FIG. 10, an example embodiment of the friend relationship database 27 will be described.

FIG. 10 is a diagram illustrating an example embodiment of the friend relationship database 27.

As illustrated in FIG. 10, the friend relationship database 27 has, for each user ID, data fields such as fields for the user ID and the user name of each user who is set as a friend of (has a friend relationship with) the user assigned the user ID. The example illustrated in FIG. 10 indicates that the user assigned the user ID "uid001" (user name "satoh") is a friend of the user assigned the user ID "uid005" (user name "sasaki") and the user assigned the user ID "uid007" (user ID "nakamura"), for example. As described above, the friend relationship database 27 stores, for each user, a friend relationship table in which users registered as friends (e.g., users having a friend relationship) are managed.

Details of processes performed in the service providing system 1 according to at least this example embodiment will now be described.

Referring to FIG. 11, a process performed when the user (assigned the user ID "uid001" and the user name "satoh") of the mobile terminal 10A searches for the other mobile terminals 10 located within a threshold (or alternatively, given, desired, or predetermined) range from the mobile terminal 10A will be described, as in the other example embodiment discussed above.

FIG. 11 is a flowchart illustrating a search process according to another example embodiment.

Referring to FIG. 11, at S1101 the user of the mobile terminal 10A performs an operation to search for the other mobile terminals 10 located within the threshold range (e.g., several centimeters to several tens of meters) from the mobile terminal 10A. The input unit 12 of the mobile terminal 10A accepts the operation and requests the search processing unit 13 to search for the other mobile terminals 10. The search processing unit 13 of the mobile terminal 10A transmits response request information within the threshold range from the mobile terminal 10A for a threshold (or alternatively, given, desired, or predetermined) period (e.g., one to several seconds).

The search processing unit 13 of the other mobile terminal 10 that has received the response request information from the mobile terminal 10A transmits response information for the received response request information to the mobile terminal 10A or the server device 20. The response information transmitted at this time contains the user ID and the user name of the user of the mobile terminal 10 that has transmitted the response information.

Upon receipt of the response information from the mobile terminals 10, the server device 20 transmits a list of the user IDs and the user names contained in the received response information to the mobile terminal 10A that has transmitted the response request information. In the case where the server device 20 receives response information, the response information need not contain the user name. In such a case, the server device 20 may obtain the user name corresponding to the user ID contained in the received response information from a given (or alternatively desired or predetermined) storage area.

It is assumed hereinafter that the mobile terminal 10A has received the user IDs and the user names of the users of the mobile terminals 10B, 10C, and 10D, as in the other example embodiment described above.

At S1102, the search processing unit 13 of the mobile terminal 10A determines whether or not the other mobile terminals 10 are located within the threshold range from the mobile terminal 10A. More specifically, the search processing unit 13 of the mobile terminal 10A determines whether the user ID and the user name of the user of the other mobile terminal 10 have been received. If the search processing unit 13 of the mobile terminal 10A has not received any user ID and any user name of the user of the other mobile terminal 10, then the process proceeds to S1103.

At S1103, the display unit 14 of the mobile terminal 10A causes the display device 106 to display a message indicating that no other mobile terminals 10 are located within the threshold range from the mobile terminal 10A. In this way, the user of the mobile terminal 10A can be informed that there are no other users near the user.

As described above, the mobile terminal 10 according to at least this example embodiment searches for the other mobile terminals 10 located nearby by using short-range wireless communication, such as BLE.

Returning to S1102, if the search processing unit 13 of the mobile terminal 10A receives user IDs and user names of users of the other mobile terminal 10, then a friend relationship registration process is performed. An example embodiment of a friend relationship registration process will be discussed in more detail below.

Unlike the example embodiment discussed above, the mobile terminal 10 according to this example embodiment does not display the search result list because a friend relationship is registered for users having a "mutual friend" or a "friend of a mutual friend" as a result of appropriately setting the distance N as described later in detail. Note that, in at least this example embodiment, the search result list may be displayed as in the above-described example embodiment so as to allow the user to select users for whom the user wishes to register a friend relationship.

Figure 12:
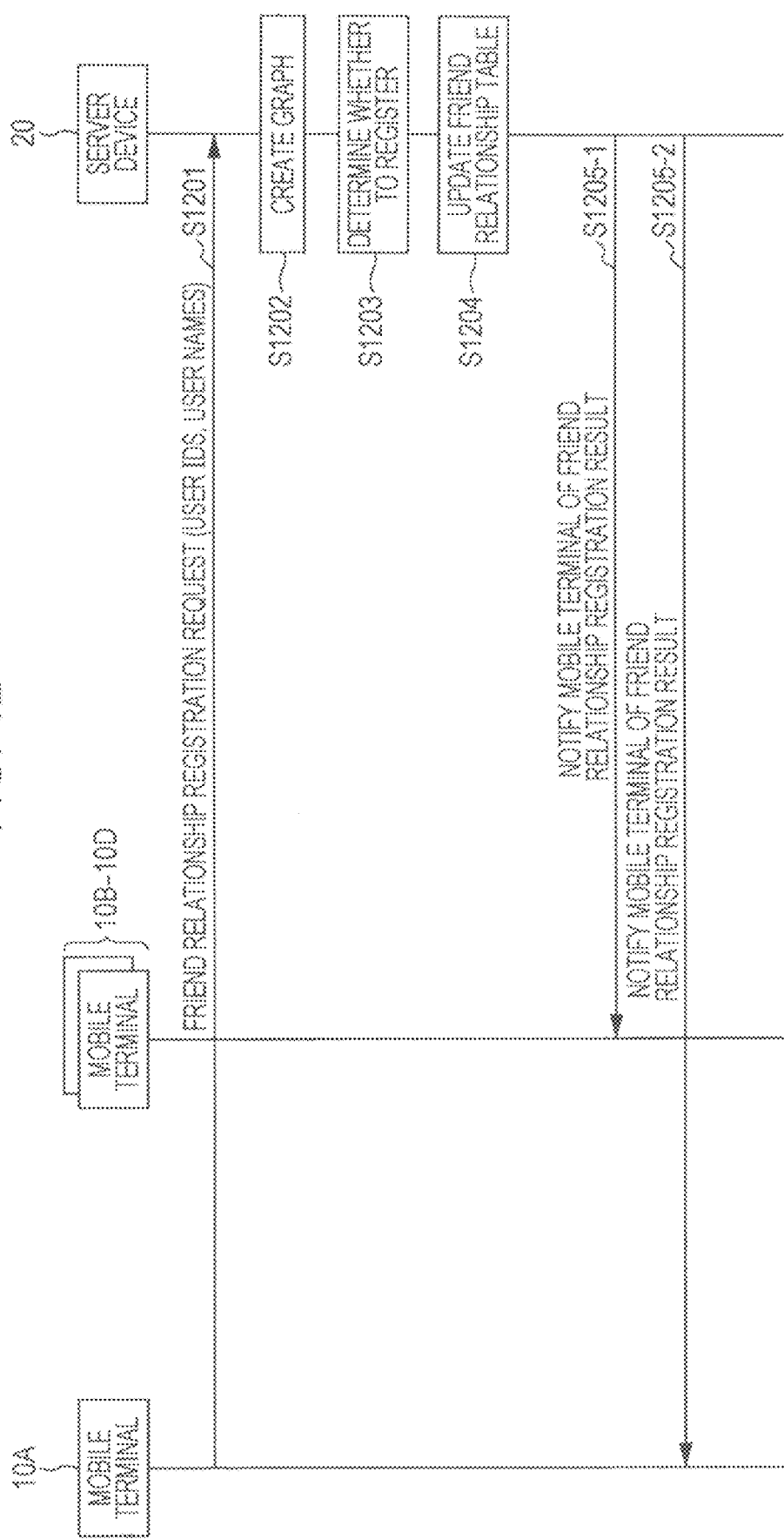
FIG. 12 is a sequence diagram illustrating a friend relationship registration process according to an example embodiment.

Referring next to FIG. 12, a process performed after the above-described search process will be described.

FIG. 12 is a sequence diagram illustrating a friend relationship registration process according to an example embodiment.

Referring to FIG. 12, at S1201 the registration requesting unit 15A of the mobile terminal 10A transmits a friend relationship registration request to the server device 20. The friend relationship registration request contains the user ID and the user name of the user of the mobile terminal 10A and the user IDs and the user names of the users of the other mobile terminals 10 that have been received at S1101 of FIG. 11. More specifically, in one example, the friend relationship registration request contains the user ID "uid001" and the user name "satoh", the user ID "uid002" and the user ID "suzuki", the user ID "uid003" and the user name "tanaka", and the user ID "uid004" and the user name "yamada".

Upon receipt of the friend relationship registration request, the graph creating unit 25 at the server device 20 creates (or generates), for each of the user IDs contained in the friend relationship registration request, a social graph of a threshold (or alternatively, given, desired, or pre-set) distance of less than or equal to N at S1202.

Figure 13:
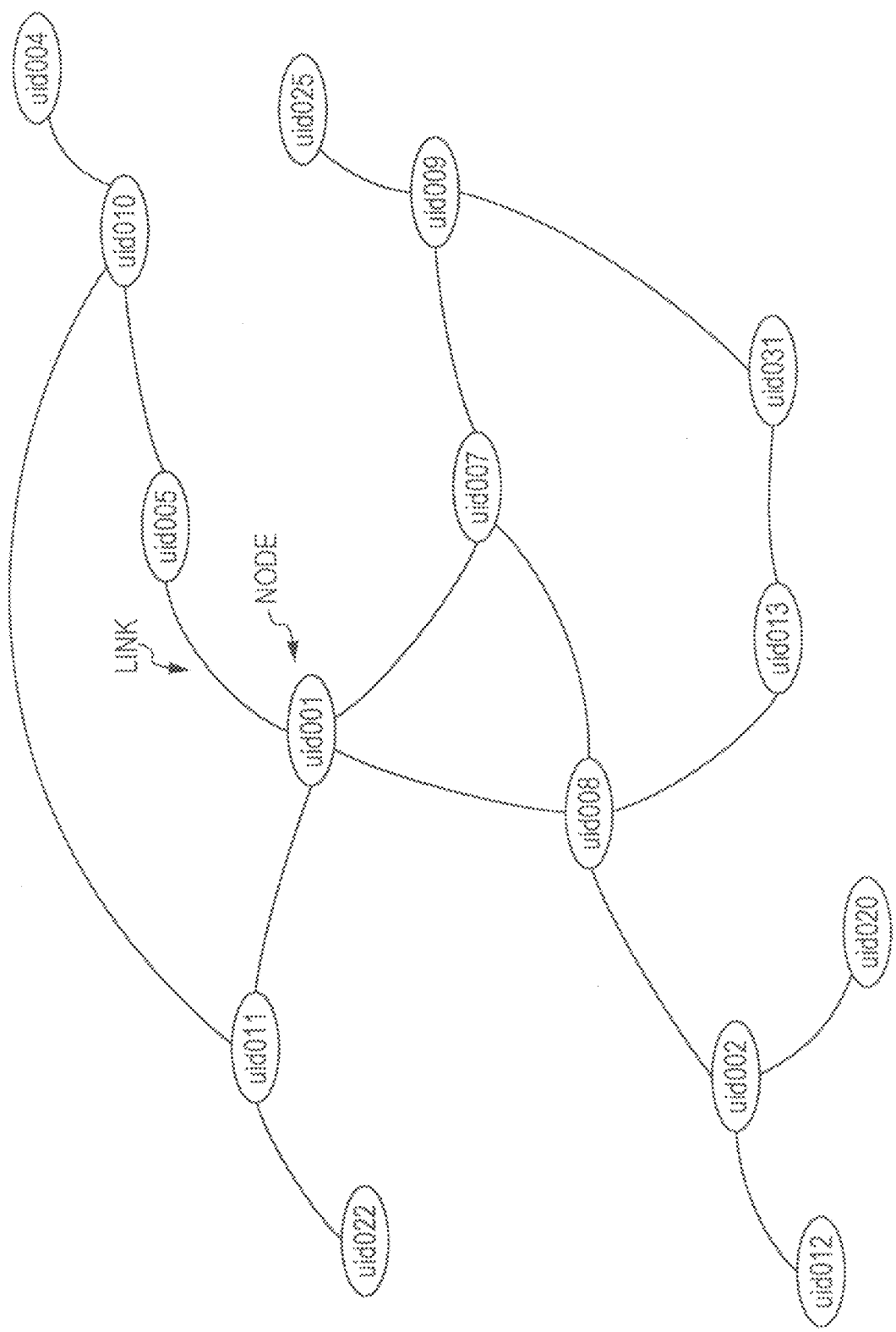
FIG. 13 is a diagram illustrating an example of a social graph.

A social graph that sets the user ID "uid001" at the center and has a distance N of less than or equal to 3 from the center is illustrated in FIG. 13.

FIG. 13 is a diagram illustrating an example embodiment of a social graph. The social graph illustrated in FIG. 13 is constituted by nodes of the user IDs for which the number of links from the user ID "uid001" located at the center is less than or equal to 3 (the distance N is less than or equal to 3). The graph creating unit 25 creates (or generates), for each of the user IDs contained in the friend relationship registration request, a social graph on the basis of the given distance N. More specifically, in at least this example embodiment, the graph creating unit 25 creates social graphs for the user IDs "uid001", "uid002", "uid003", and "uid004" on the basis of the given distance N. Note that the distance N may be set to an identical value for all users, or to different values for different users. In addition, the user of the mobile terminal 10 may be allowed to set the distance N to a desired value.

Returning to FIG. 12, at S1203 the whether-to-register determining unit 26 of the server device 20 determines, for each of the user IDs contained in the friend relationship registration request, whether to register friend relationships for the user ID and the other user IDs contained in the friend relationship registration request.

More specifically, the whether-to-register determining unit 26 determines whether the social graph created for the user ID "uid001" in step S1202 includes each of the other user IDs "uid002", "uid003", and "uid004" contained in the friend relationship registration request. The whether-to-register determining unit 26 determines that a friend relationship is to be registered for each of the other user IDs included in the social graph for the user ID "uid001". For example, in the example embodiment illustrated in FIG. 13, the social graph for the user ID "uid001" includes the user IDs "uid002" and "uid004". Accordingly, the whether-to-register determining unit 26 determines that the user IDs "uid001" and "uid002" and the user IDs "uid001" and "uid004" are to be registered to have friend relationships. In contrast, the whether-to-register determining unit 26 determines that the user IDs "uid001" and "uid003" are not to be registered to have a friend relationship.

Likewise, the whether-to-register determining unit 26 determines whether the social graph for the user ID "uid002" includes each of the user IDs "uid003" and "uid004". Also, the whether-to-register determining unit 26 determines the social graph for the user ID "uid003" includes the user ID "uid004".

As described above, the whether-to-register determining unit 26 determines whether a social graph for each of the users whose user IDs are contained in a friend relationship registration request includes each of the other users whose user IDs are also contained in the friend relationship registration request. In other words, for example, the whether-to-register determining unit 26 determines whether a distance between a user whose user ID is contained in a friend relationship registration request and each of the other users whose user IDs are also contained in the friend relationship registration request is less than or equal to the given value N. The whether-to-register determining unit 26 then determines that users having a distance of less than or equal to N are to be registered to have a friend relationship.

Still referring to FIG. 12, at S1204 the registration processing unit 22A of the server device 20 updates the friend relationship tables for the users ID for which it has been determined at S1203 that a friend relationship is to be registered, in the friend relationship database 27.

For example, in the case where it is determined at S1203 that the user IDs "uid001" and "uid002" are to be registered to have a friend relationship, the registration processing unit 22A adds a record of the user ID "uid002" to the friend relationship table for the user ID "uid001" in the friend relationship database 27. Likewise, the registration processing unit 22 adds a record of the user ID "uid001" to the friend relationship table for the user ID "uid002" in the friend relationship database 27. As a result, the user assigned the user ID "uid001" and the user assigned the user ID "uid002" have a friend relationship and become able to transmit and receive a message to and from each other.

If the user IDs for which it has been determined at S1203 that a friend relationship is to be registered have been set as friends (if a friend relationship has been registered), then the registration processing unit 22 may not perform any processing at S1204.

At S1205-1, the registration processing unit 22A of the server device 20 transmits a friend relationship registration result obtained at S1204 to the mobile terminals 10B to 10D.

Likewise, at S1205-2, the registration processing unit 22A of the server device 20 transmits a friend relationship registration result obtained at S1204 to the mobile terminal 10A. As described above, the registration processing unit 22A transmits a friend relationship registration result to the mobile terminals 10 associated with the user IDs contained in a friend relationship registration request. The friend relationship registration result transmitted by the registration processing unit 22A contains the user IDs and the user names of users who have been set as friends with the user of the mobile terminal 10 serving as the transmission destination (e.g., for whom a friend relationship has been registered). In this way, the user of the mobile terminal 10 can be informed of the other users set as friends of the user's.

As described above, upon receipt of a friend relationship registration request containing a plurality of user IDs from the mobile terminal 10, the server device 20 according to at least this example embodiment is configured to execute a program and/or computer readable instructions to create social graphs for the respective user IDs on the basis of the given distance N. Then, the server device 20 according to at least this example embodiment is configured to execute a program and/or computer readable instructions to register a plurality of users to mutually have friend relationships on the basis of the created social graphs. Such a configuration makes it possible to register friend relationships between a plurality of users at one time (e.g., concurrently and/or simultaneously) in the service providing system 1 according to at least this example embodiment.

In at least this example embodiment, it is determined whether to register friend relationships for the user IDs contained in a friend relationship registration request; however, the configuration is not limited to this example. For example, it may be determined whether to register the user of the mobile terminal 10A and each of the users of the mobile terminals 10B to 10D to have a friend relationship, for example (in this case, the users of the mobile terminals 10B and 10C are not set as friends).

In at least this example embodiment, the case of registering a plurality of users to have friend relationships has been described; however, the configuration is not limited to this example, and a group relationship including a plurality of users may be registered on the basis of social graphs.

More specifically, for example, at S1201 in FIG. 12 the mobile terminal 10 may transmit, to the server device 20, a group relationship registration request containing the user IDs and the user names of a plurality of users constituting a group. In this case, the server device 20 may register a group relationship including the user of the mobile terminal 10 that has transmitted the group relationship registration request and users included in this user's social graph having a distance of less than or equal to N, from among the plurality of users contained in the group relationship registration request.

Note that example embodiments are not limited to those described herein, and various modifications and alterations can be made without departing from the scope of the claims.

What is claimed is:

1. A server configured to manage a group for transmitting or receiving messages, and communicate with a first terminal, the server comprising:

a communication device; and
one or more processors configured to execute computer readable instructions to
receive, via the communication device, from the first terminal, information for generating a first group including at least a user of a second terminal, a user of a third terminal, and a user of the first terminal, wherein the user of the second terminal and the user of the third terminal are selected by the user of the first terminal based on respective information items corresponding to users of a plurality of terminals, each of the plurality of terminals being different from the first terminal, the respective information items being displayed on a display device of the first terminal based on information received by the first terminal via short-range wireless communication of the first terminal,
transmit, via the communication device, first information on participation in the first group to the second terminal and the third terminal,
receive, via the communication device, second information on whether to participate in the first group transmitted from the second terminal based on the first information, and third information on whether to participate in the first group transmitted from the third terminal based on the first information; and
controlling participation in the first group based on the second information and the third information.

2. The server as claimed in claim 1, wherein the first information is displayed at least on a display device of the second terminal and on a display device of the third terminal,
wherein the second information is transmitted to the server based on an input corresponding to the first information displayed on the display device of the second terminal, and
wherein the third information is transmitted to the server based on an input corresponding to the first information displayed on the display device of the third terminal.

3. The server as claimed in claim 1, wherein the one or more processors are configured to execute computer-readable instructions to receive, via the communication device, from the first terminal, information for registering the user of the second terminal or the user of the third terminal as a friend of the user of the first terminal.

4. The server as claimed in claim 1, wherein the information received via the short-range wireless communication includes a user ID of each of the plurality of terminals,
wherein the one or more processors are configured to execute computer-readable instructions to identify the respective information items corresponding to the users of the plurality of terminals based on the user ID of each of the plurality of terminals.

5. The server as claimed in claim 1, wherein the second information and the third information include one of an acceptance of participation in the first group or a denial of participation in the first group.

6. The server as claimed in claim 5, wherein the one or more processors are configured to execute computer-readable instructions to prevent the user of the second terminal from participating in the first group in response to receiving, via the communication device, the denial of participation in the first group as the second information.

7. A non-transitory computer-readable recording medium having computer-readable instructions stored thereon, which when executed, cause a server to execute a process for managing a group for transmitting or receiving messages, and communicating with a first terminal, the server including a communication device, the process comprising:

receiving, via the communication device, from the first terminal, information for generating a first group including at least a user of a second terminal, a user of a third terminal, and a user of the first terminal, wherein the user of the second terminal and the user of the third terminal are selected by the user of the first terminal based on respective information items corresponding to users of a plurality of terminals, each of the plurality of terminals being different from the first terminal, the respective information items being displayed on a display device of the first terminal based on information received by the first terminal via short-range wireless communication of the first terminal;

transmitting, via the communication device, first information on participation in the first group to the second terminal and the third terminal;

receiving, via the communication device, second information on whether to participate in the first group transmitted from the second terminal based on the first information, and third information on whether to participate in the first group transmitted from the third terminal based on the first information; and controlling participation in the first group based on the second information and the third information.

8. The non-transitory computer-readable recording medium as claimed in claim 7, wherein the first information is displayed at least on a display device of the second terminal and on a display device of the third terminal, wherein the second information is transmitted to the server based on an input corresponding to the first information displayed on the display device of the second terminal, and wherein the third information is transmitted to the server based on an input to the first information displayed on the display device of the third terminal.

9. The non-transitory computer-readable recording medium as claimed in claim 7, the process includes receiving, via the communication device, from the first terminal, information for registering the user of the second terminal or the user of the third terminal as a friend of the user of the first terminal.

10. The non-transitory computer-readable recording medium as claimed in claim 7, wherein the information received via the short-range wireless communication includes a user ID of each of the plurality of terminals, wherein the process includes identifying the respective information items corresponding to the users of the plurality of terminals based on the user ID of each of the plurality of terminals.

11. The non-transitory computer-readable recording medium as claimed in claim 7, wherein the second information and the third information include one of an acceptance of participation in the first group or a denial of participation in the first group.

12. The non-transitory computer-readable recording medium as claimed in claim 11, wherein the process includes preventing the user of the second terminal to participate in the first group in response to receiving, via the communication device, the denial of participation in the first group as the second information.

13. An information processing method, executed by a server including a communication device, for managing a group for transmitting or receiving messages, and communicating with a first terminal, the method comprising:

receiving, via the communication device, from the first terminal, information for generating a first group including at least a user of a second terminal, a user of a third terminal, and a user of the first terminal, wherein the user of the second terminal and the user of the third terminal are selected by the user of the first terminal based on respective information items corresponding to users of a plurality of terminals, each of the plurality of terminals being different from the first terminal, the respective information items being displayed on a display device of the first terminal based on information received by the first terminal via short-range wireless communication of the first terminal;

transmitting, via the communication device, first information on participation in the first group to the second terminal and the third terminal;

receiving, via the communication device, second information on whether to participate in the first group transmitted from the second terminal based on the first information, and third information on whether to participate in the first group transmitted from the third terminal based on the first; and controlling participation in the first group based on the second information and the third information.

\* \* \* \* \*